United States Patent [19]

Numaho et al.

[11] Patent Number: 4,620,137

[45] Date of Patent: Oct. 28, 1986

[54] SWEEP TERMINATION SIGNAL GENERATING APPARATUS FOR RADAR SYSTEM

[75] Inventors: Yoshio Numaho; Yoshio Kato, both of Tokyo; Hiroshi Okada, Chiba; Tetsuro Ogawa, Tokyo, all of Japan

[73] Assignee: Tokyo Keiki Company, Ltd., Tokyo, Japan

[21] Appl. No.: 515,253

[22] Filed: Jul. 19, 1983

[30] Foreign Application Priority Data

Jul. 21, 1982 [JP] Japan .................................. 57-127408

[51] Int. Cl.[4] .......................... H01J 29/78; G01S 7/14
[52] U.S. Cl. ...................................... 315/378; 342/182
[58] Field of Search ............. 343/5 EM, 17; 315/378, 315/386

[56] References Cited

U.S. PATENT DOCUMENTS

| | | | |
|---|---|---|---|
| 2,720,645 | 10/1955 | Sherwin | 315/378 X |
| 2,864,969 | 12/1958 | Shulman | 315/386 |
| 4,059,785 | 11/1977 | Clark, Jr. | 315/378 |
| 4,307,396 | 12/1981 | Slater | 343/5 EM |

Primary Examiner—Theodore M. Blum
Assistant Examiner—Gilberto Barrón, Jr.
Attorney, Agent, or Firm—Wenderoth, Lind & Ponack

[57] ABSTRACT

A sweep termination generating circuit adopts an octagon boundary for sweep termination which is set by combining a plurality of comparators so as to be circumscribed about the display screen of a circular CRT. When the sweep position is deviated from the center of the display screen for the purpose of displaying a radar image by PPI sweep, the circuit allows the comparators to detect that a scanning signal for scanning an electron beam from the off-center sweep position has reached the boundary for sweep termination and thereby generates a sweep termination signal.

4 Claims, 6 Drawing Figures

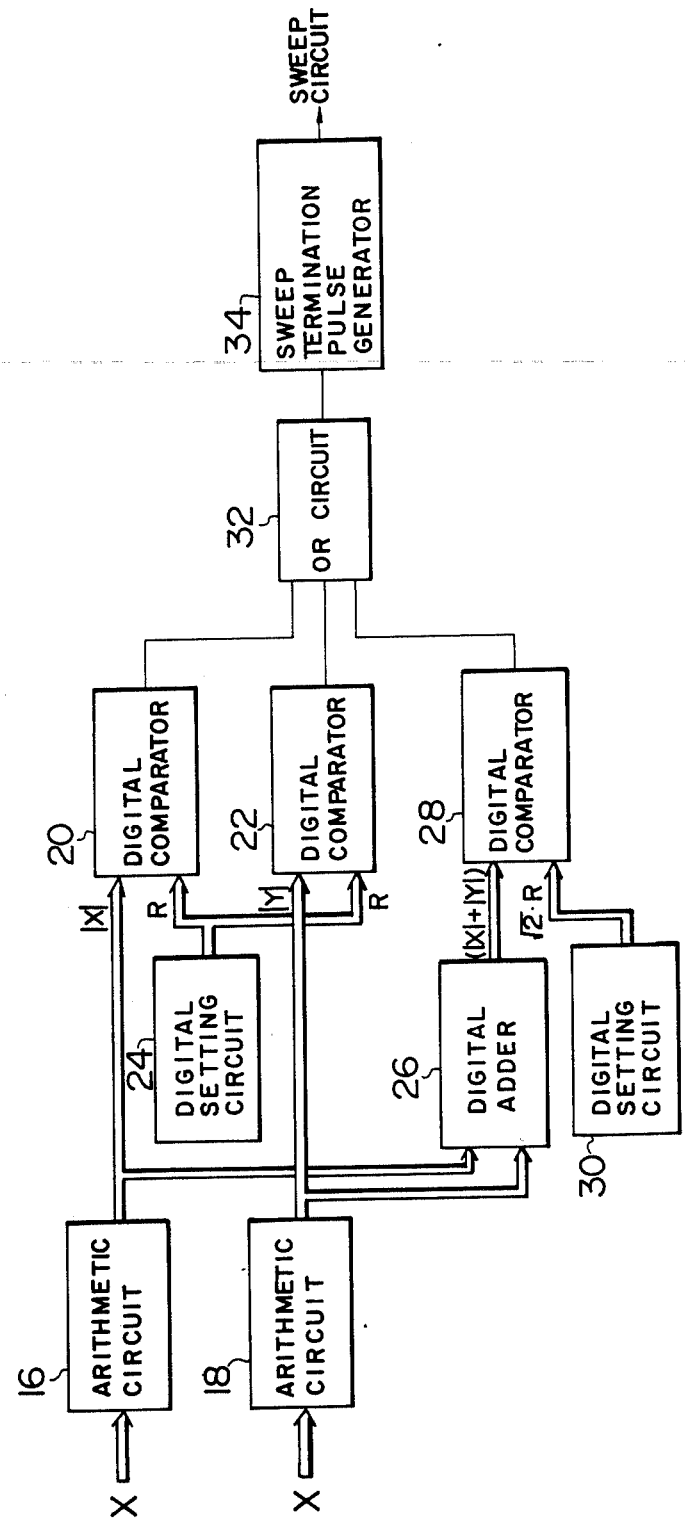
F I G. 5

SWEEP TERMINATION SIGNAL GENERATING APPARATUS FOR RADAR SYSTEM

BACKGROUND OF THE INVENTION

1. Field of the Invention

The present invention relates to an apparatus for displaying information of a radar, sonar, etc. on a circular screen of a cathode-ray tube (CRT) by utilization of a polar coordinate deflection system (a PPI system) and particularly relates to a sweep termination signal generator for generating a sweep termination signal which commands the termination of a sweep signal for the deflection of an electron beam.

2. Description of the Prior Art

A conventional marine radar has its transmission position, i.e. the position of a ship per se, deviated from the central point O of a plan position indicator (PPI) display provided with a circular CRT to a backward point P to widen the range of forward supervision, as illustrated in FIG. 1. That is to say, the marine radar has an off-center function.

When display is effected by a PPI display having the aforementioned off-center function, it is desirable to terminate sweep of an electron beam by cutting unnecessary part of the sweep signal as soon as the deflection position of the electron beam reaches a position of the outermost circumferential edge of a CRT screen from a viewpoint of power consumption.

The relationship between the sweep signal and the sweep termination signal will be described hereinafter with reference to waveform diagrams in FIG. 2. When the bearing angle of an antenna is of $\theta_A$ in FIG. 1, a sweep termination signal $E_A$ is generated at the time that an electron beam deflected by a sweep signal of sweep $S_A$ effected upon occurrence of a trigger has reached a point A on the outer circumference of the PPI display, i.e. at the lapsed time of $T_A$ from the occurrence of the trigger to thereby terminate the sweep signal of the sweep $S_A$. Similarly, when the bearing angle of the antenna is of $\theta_N$ in FIG. 1, a sweep termination signal $E_N$ is generated at the lapsed time of $T_N$ from the occurrence of the trigger. In other words, when the electron beam has reached a point N on the outer circumference of the PPI display, the sweep $S_N$ is terminated.

However, the sweep velocity during real time in a radar etc. is considerably high. Since the time required when a radio wave reciprocates one fourth of a naulical mile is 3 $\mu$s ($3 \times 10^{-6}$ sec.), for example, a deflection velocity for deflecting an electron beam to an extent of about 20 cm during the aforementioned time comes to about 66 KM/sec. Therefore, it has been difficult to materialize an apparatus capable of rapidly accurately calculating the time that an electron beam reaches the outer circumference of the PPI display, which time varies with variation in the bearing angle of an antenna relative to an optional off-center point in the PPI display, without incurring any excess cost.

For these reasons, a conventional apparatus has laid stress on an economical point and a point of high velocity. To be specific, the conventional apparatus sets a regular square having a side of 2R with a PPI display of a radius of R having a circular CRT used in order to determine the termination of sweep and allows a sweep termination signal to be generated by means of this regular square, as shown in FIG. 3.

FIG. 3 will be mathematically explained. Assuming that the central point O of the PPI display is regarded as the origin of the rectangular coordinate axes X and Y, the absolute values $|X|$ and $|Y|$ of a deflection position (X, Y) kaleidoscopically varied by sweep signals from an off-center point P are calculated and, when at least one of the calculated absolute values $|X|$ and $|Y|$ exceeds the radius R of the PPI display, i.e. $|X| > R$ and/or $|Y| > R$, a sweep termination signal is generated to terminate the sweep.

However, the conventional method for the termination of sweep, as illustrated in FIG. 3, exhibits low accuracy concerning the sweep termination. In the sweep when the bearing angle of an antenna is set to be $\theta_A$, for example, the sweep is terminated at a point B in spite of the fact that the point at which the sweep is to be terminated is a point A. In this case, therefore, the sweep has been effected for a longer period of time by the distance $\overline{AB}$ than the period of time to be actually required. That is to say, the conventional method is disadvantageous in that the portion of the sweep represented by the oblique lines in FIG. 3 corresponds to excess power consumption and excess sweeping time.

SUMMARY OF THE INVENTION

An object of the present invention is to provide a sweep termination signal generating circuit in a radar system, which is capable of generating a sweep termination signal when an electron beam scanned from a sweep center which may be off-center reaches the display limitation in a CRT screen and allowing the electron beam deviated from the display limitation not to be swept.

Another object of the present invention is to provide a sweep termination signal generating circuit in a radar system, which is capable of economizing electric power by terminating the sweep of an electron beam within the display limitation in a CRT screen.

Still another object of the present invention is to provide a sweep termination signal generating circuit in a radar system, which has a simple circuit construction and is capable of terminating the sweep with high accuracy by setting a boundary of an octagon approximating the display limitation in a circular CRT screen, detecting whether or not the deflection position of an electron beam reaches the boundary, and when the deflection position reaches the boundary, immediately generating a sweep termination signal.

Yet another object of the present invention is to provide a sweep termination signal generating circuit in a radar system, which has a construction such that a sweep termination signal is generated by a digital circuit.

A further object of the present invention is to provide a sweep termination signal generating circuit in a radar system, which has a construction such that a sweep termination signal is generated by an analog circuit.

The aforementioned objects and other objects, features and advantages of the present invention will become apparent from the following description taken in connection with the accompanying drawings.

BRIEF DESCRIPTION OF THE DRAWINGS

FIG. 5 is a block diagram showing one embodiment of the present invention, wherein a digital system is adopted.

DESCRIPTION OF THE PREFERRED EMBODIMENTS

Figure 4:
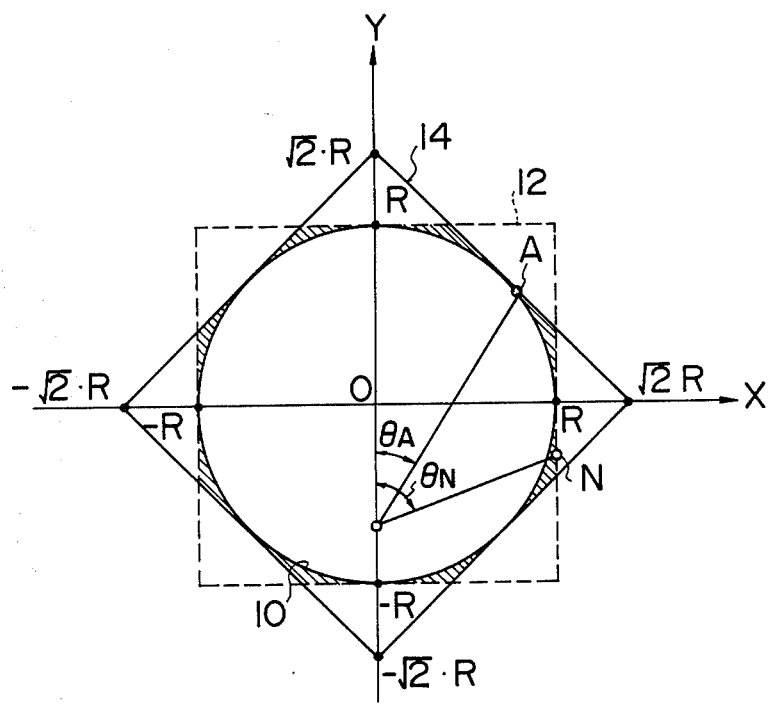
FIG. 4 is an explanatory view showing the principle of sweep termination according to the present invention.

FIG. 4 is an explanatory view showing the principle of the generation of a termination signal in a sweep termination signal generating apparatus according to the present invention.

Figure 1:
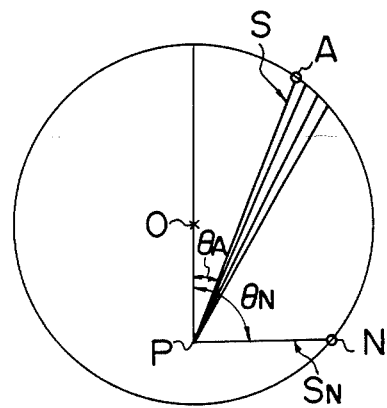
FIG. 1 is an explanatory view showing conventional sweep by a PPI display having an off-center function.
Figure 2:
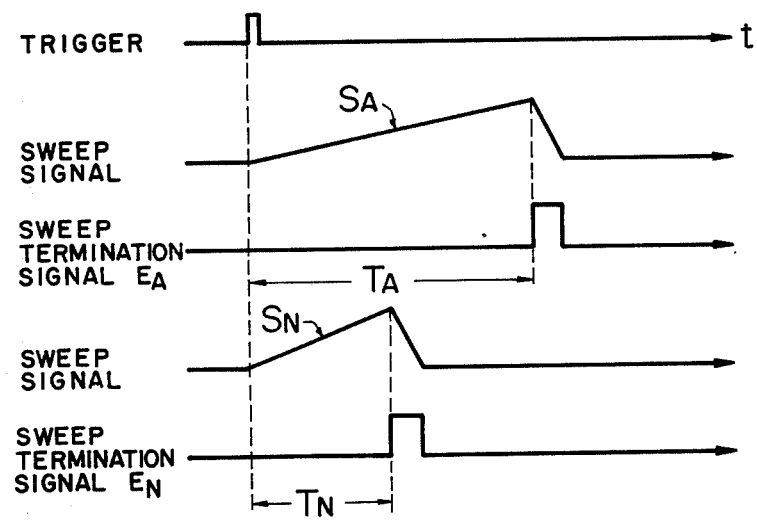
FIG. 2 is an explanatory view showing sweep signals issued when sweep utilizing an off-center function is effected and rational sweep termination signals.
Figure 3:
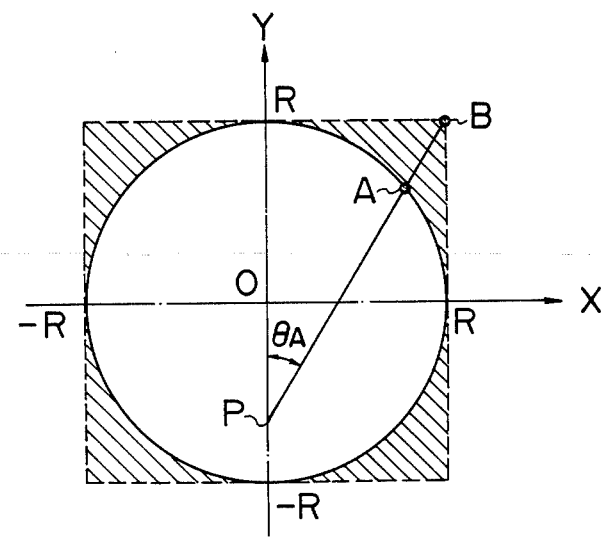
FIG. 3 is an explanatory view showing conventional sweep termination put to actual application.

In FIG. 4, reference numeral 10 denotes a display screen of a PPI display provided with a circular CRT having a radius of R. Rectangular coordinates are set, with the center O of the PPI display 10 serving as the origin of the rectangular coordinate axes X and Y. A regular square 12 having a side of 2R shown by the broken line in FIG. 4 is circumscribed about the PPI display 10 as in the conventional apparatus shown in FIG. 3. Another regular square 14 having a side of 2R shown by the solid line in FIG. 4 is further circumscribed about the PPI display so that the diagonal lines thereof coincide with the X and Y axes of the rectangular coordinates. As a result, a regular octagon defined by the two regular squares 12 and 14 comes to be circumscribed about the PPI display 10. This octagon approximating a circle is used as a boundary at which sweep is to be terminated.

Assuming that the deflection position of an electron beam to be subjected to PPI sweep limited by the regular square 12 shown by the broken line in FIG. 4 is represented by a coordinate position (X, Y), the X and Y are limited to $|X|>R$ and $|Y|>R$ respectively similarly to the case of the conventional apparatus.

The electron beam deflection range limited by the regular square 14 newly set in the present invention is represented by the following equations:

$$Y < -X + \sqrt{2R} \text{ when } X > 0 \text{ and } Y > 0 \quad (1)$$

$$Y < X + \sqrt{2R} \text{ when } X < 0 \text{ and } Y > 0 \quad (2)$$

$$Y > -X - \sqrt{2R} \text{ when } X < 0 \text{ and } Y < 0 \quad (3)$$

$$Y > X - \sqrt{2R} \text{ when } X > 0 \text{ and } Y < 0 \quad (4)$$

The equations (1) to (4) stand for the deflection regions in the first to fourth quadrants respectively of the rectangular coordinate system falling within the range defined by the regular square 14.

Therefore, when a coordinate position (X, Y) representing the deflection position of an electron beam to be subjected to PPI sweep satisfies all of the aforementioned equations (1) to (4), the sweep of the electron beam is permitted to continue and, when the coordinate position fails to satisfy any one of the equations (1) to (4), a sweep termination signal may be generated.

Further, since the deflection regions represented by the equations (1) to (4) are symmetrical relative to the coordinate origin O, the equations (1) to (4) can be substituted by the following equation using the absolute values of the coordinate position (X, Y):

$$|X| + |Y| < \sqrt{2R} \quad (5)$$

In other words, sweep is continuously effected under the condition that the equation (5) is satisfied and, under the condition of the following equation (6), i.e. when the sweep position of the electron beam falls out of the boundary defined by the regular square 14, the sweep may be terminated.

$$|X| + |Y| > \sqrt{2R} \quad (6)$$

In the present invention, therefore, when the sweep position of the electron beam falls out of the octagonal boundary defined by the regular square 12 and the regular square 14 shown by the broken line and the solid line respectively in FIG. 4, a sweep termination signal may be generated. The mathematical conditions therefor are as follows:

(a) The absolute value of X is larger than the radius R ($|X|>R$), (b) The absolute value of Y is larger than the radius R ($|Y|>R$), or (c) The sum of the absolute value of X and that of Y is larger than the value obtained by multiplying the radius R by $\sqrt{2}$ ($|X|+|Y|>\sqrt{2R}$).

That is to say, a sweep termination signal for terminating the sweep for the deflection of the electron beam is to be generated when any one of the conditions (a) to (c) has been satisfied.

FIG. 5 is a block diagram showing one embodiment of the termination signal generating apparatus according to the present invention, which is constructed on the basis of the principle of generation of a sweep termination signal so far described with reference to FIG. 4 and which allows the sweep termination signal to be generated by a digital system.

The construction of this embodiment will be described. Denoted by 16 and 18 are arithmetic circuits for calculating the absolute values of X and Y respectively. To the arithmetic circuit 16 is inputted a signal for the X coordinate position obtained from the deflection signals sucessively calculated in accordance with the bearing angle of a radar antenna, i.e. an X-axis digital coordinate signal for the X coordinate position in rectangular coordinates of an electron beam subjected to PPI sweep on a CRT screen. The arithmetic circuit 16 converts this X-axis digital coordinate signal into the absolute value $|X|$ and outputs the absolute value. A Y-axis digital coordinate signal for the Y coordinate position in the rectangular coordinates of the electron beam subjected to PPI sweep is inputted to the arithmetic circuit 18, then converted there into the absolute value $|Y|$, and outputted therefrom.

The signal of the absolute value 51 $X|$ outputted from the arithmetic circuit 16 is inputted to a first digital comparator 20 for comparing the absolute value $|X|$ with the display radius R of the CRT screen set as a reference value by a digital setting circuit 24. The first digital comparator 20 issues an output of a high level when the absolute value $|X|$ becomes higher than the display radius R.

Denoted by 22 is a second digital comparator for allowing the signal of the absolute value $|Y|$ from the arithmetic circuit 18 to be inputted thereto and comparing the inputted signal with the display radius R set by the digital setting circuit 24. When the absolute value |Y| comes to exceed the display radius R, the second digital comparator 22 issues an output of a high level.

In this embodiment, the rectangular coordinate position (X, Y) to be calculated on the basis of the bearing angle $\theta$ of the antenna is calculated under real-time operation by coordinate transformation calculation of the polar coordinate wherein equations of $X = N \cdot \cos \theta$ and $Y = N \cdot \sin \theta$ are satisfied when the digital value of a counter which starts upon occurrence of a trigger signal is represented by N and the bearing angle of the antenna is represented by $\theta$ into rectangular coordinates.

The aforementioned digital comparators 20 and 22 function to discriminate whether or not the sweep position of the electron beam falls out of the boundary defined by the regular square 12 shown by the broken line in FIG. 4.

As for means for discriminating whether or not the sweep position of the electron beam falls out of the boundary defined by the regular square 14 shown by the solid line in FIG. 4, there are adopted in this embodiment a digital adder 26 and a third digital comparator 28. The digital adder 26 serves to permit the input of the signals of the absolute values |X| and |Y| the coordinate position (X, Y) of the swept electron beam outputted from the arithmetic circuits 16 and 18, digitally add the signals and output the resultant signal (|X|+|Y|).

The third digital comparator 28 serves to compare the signal (|X|+|Y|) outputted from the digital adder 26 with $\sqrt{2}R$ which is set as a reference value by another digital setting circuit 30 and to issue a high-level output when the output signal (|X|+|Y|) exceeds the reference value $\sqrt{2}R$. That is to say, the third digital comparator 28 makes a comparison and discriminate between the conditions of the aforementioned equations (5) and (6).

The outputs from the digital comparators 20, 22 and 28 are collected in an OR circuit 32. The output from the OR circuit 32 is transmitted to a sweep termination pulse generator 34. When the OR circuit 32 issues an output of a high level, a sweep termination pulse is given to the sweep signal generating circuit portion to thereby terminate the sweep of an electron beam. As for the digital adder 26 shown in FIG. 5, a 4-bit adder IC 7483, a product of Texas Instruments Ltd., may be used. A fixed number of the 4-bit adders may be brought to cascade connection to constitute an adder having a desired number of bits. The value $\sqrt{2}$ of the reference value $\sqrt{2}R$ set in the setting circuit 30 and transmitted to the digital comparator 28 is not necessarily required to be a precise value, but may be an approximate value.

The function of the embodiment shown in FIG. 5 will be described.

In the PPI display 10 shown in FIG. 4, sweep is effected under the conditions that the off-center point P is regarded as a center and that the bearing angle of an antenna is denoted by $\theta$. When the bearing angle of the antenna is of $\theta_A$, for example, sweep is started upon occurrence of a trigger signal, the coordinate position (X, Y) of the swept electron beam is obtained by coordinate transformation into rectangular coordinates, and the absolute values |X| and |Y| are calculated in the arithmetic circuits 16 and 18 and inputted successively to the digital comparators 20 and 22 and the digital adder 26. When the swept electron beam has reached the point A on the boundary of the regular square 14 shown by the solid line, in this case, the added output (|X|+|Y|) of the digital adder 26 becomes equal to the reference value $\sqrt{2}R$ set in the digital comparator 28. When the added output value of the digital adder 26 exceeds the reference value $\sqrt{2}R$, the digital comparator 28 issues a high-level output to operate the sweep termination pulse generator 34 via the OR circuit 32 and transmit a sweep termination pulse having a given pulse width to the sweep termination generating circuit portion, with the result that the sweep in case where the bearing angle of the antenna is of $\theta_A$ is terminated.

On the other hand, assuming that sweep in case where the bearing angle of the antenna shown in FIG. 4 is of $\theta_N$ is effected upon occurrence of a trigger signal, when the electron beam has reached the point N on the boundary of the regular square 12 shown by the broken line, the absolute value |X| of the sweep position (X, Y) becomes equal to the radius R. When the absolute value |X| exceeds the radius R, the digital comparator 20 issues an output to operate the sweep termination pulse generator 34 via the OR circuit 32, with the result that a sweep termination pulse is generated to terminate the sweep having the antenna bearing angle of $\theta_N$.

According to the sweep termination signal generating apparatus of the present invention having the construction and function as described above, since the portions shown by the oblique lines in FIG. 4 are the excessively swept portions and since the sweep is terminated at a sweep position which substantially coincides with the outer circumference of the PPI display 10 to be subjected to sweep termination, the sweep termination accuracy is considerably enhanced and both the power consumption and the excess sweeping time loss are reduced as compared with the conventional apparatus which allows the sweep to be terminated when the electron beam has reached the boundary position of the regular square 12 shown by the broken line.

Figure 6:
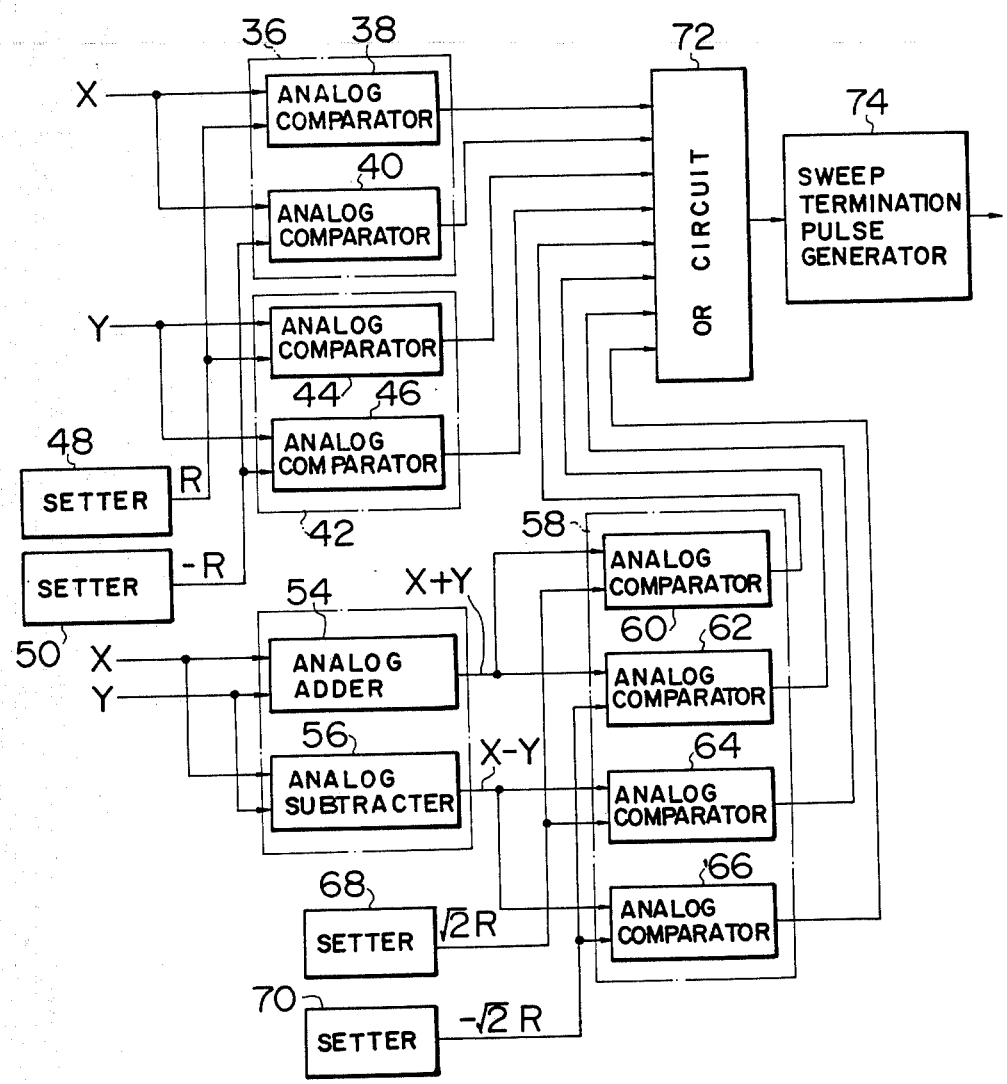
FIG. 6 is a block diagram showing another embodiment of the present invention, wherein an analog system is adopted.

FIG. 6 is a block diagram showing another embodiment of the present invention, characterized in that a sweep termination signal is generated by an analog system.

In the first place, the construction of this embodiment will be described. A first analog comparison circuit 36 provided with analog comparators 38 and 40 and a second comparison circuit 42 provided with analog comparators 44 and 46 are used as means for discriminating between the inside and the outside of the boundary of the regular square 12 shown by the broken line in FIG. 4, and compare signals of a sweep coordinate position (X, Y) with reference values R and $-R$ set by setters 48 and 50 respectively. Outputs from the four analog comparators 38, 40, 44 and 46 are inputted to an OR circuit 72.

As means for discriminating between the inside and the outside of the boundary of the regular square 14 shown by the solid line in FIG. 4, there are used an analog adder 54, an analog subtracter 56 and a third analog comparison circuit 58 constituted by analog comparators 60, 62, 64 and 66. The analog adder 54 serves to obtain the sum of two sweep coordinate signals X and Y when the polarities of X and Y are the same as each other.

The analog subtracter 56 serves to invert one of the symbols of the two sweep coordinate signals X and Y which have different polarities and obtain the sum of the inverted one and the remaining one.

The outputs from the analog adder 54 and the analog subtracter 56 are transmitted respectively to the analog comparators 60, 62 and the analog comparators 64, 66 to be compared with the reference value $\sqrt{2}R$ set by a setter 68 and with the reference value $-\sqrt{2}R$ set by another setter 70. The outputs from the four analog comparators are inputted to the OR circuit 72.

In the second place, the analog comparison circuits will be described theoretically. The analog comparators 38 and 40, for example, compare the input signal X with the reference value R when the sweep coordinate signal X has a positive polarity and with the reference value $-R$ when the signal X has a negative polarity. Therefore, the aforementioned comparisons are equivalent to a comparison between the absolute value $|X|$ and the reference value R. Similarly, since the analog comparators 44 and 46 compare the signal Y of a positive polarity with the reference value R and the signal Y of a negative polarity with the reference value $-R$, these comparisons are equivalent to a comparison between the absolute value $|Y|$ and the reference value R.

The analog adder 54 fulfills its function when the polarities of X and Y are the same and issues addition output $(X+Y)$ or $-(X+Y)$. The outputs $(X+Y)$ and $-(X+Y)$ from the adder 54 are compared respectively with the reference values $\sqrt{2}R$ and $-\sqrt{2}R$ in the analog comparators 60 and 62. When the value of the output exceeds the reference value, a high-level output is issued by either of the analog comparators 60 and 62 and transmitted to the OR circuit 72.

The analog subtracter 56 fulfills its function when the polarities of X and Y are different and, similarly to the case of the adder 54, issues an output $\{X-(-Y)\}=(X+Y)$ or $\{(-X)-(Y)\}=-(X+Y)$. The output $(X+Y)$ is compared with the reference value $\sqrt{2}R$ in the analog comparator 64, and the output $-(X+Y)$ with the reference value $-\sqrt{2}R$ in the analog comparator 66. An output from either of the analog comparators 64 and 66 is similarly transmitted to the OR circuit 72. Thus, the aforementioned comparisons are equivalent to a comparison between $(|X|+|Y|)$ and the reference value $\sqrt{2}R$.

The function of the embodiment shown in FIG. 6 will be described. In the case of the sweep wherein the off-center point P is utilized and the bearing angle of the antenna is of $\theta_A$ as shown in FIG. 4, since the polarities of the coordinate positions X and Y are both positive, an output from the adder 54 is compared with the reference value $\sqrt{2}R$ in the analog comparator 60 and, when the sweep position moves past the point A on the boundary of the regular square 14 shown by the solid line, the comparator 60 issues a high-level output which is transmitted to the OR circuit 72 and then the sweep termination pulse generator 74 is actuated to terminate the sweep.

In case where the antenna bearing angle is of $\theta_N$, the value of X is compared with the reference value R in the analog comparator 38 and, when the sweep position moves past the point N on the boundary of the regular square 12 shown by the broken line, the comparator 38 issues a high-level output which is transmitted to the OR circuit 72 and then the sweep termination pulse generator 74 is similarly actuated to terminate the sweep.

As described above, with the sweep termination signal generator utilizing an analog system shown in FIG. 6, sweep can be effected within the range which substantially coincides with the outer circumference of the PPI display similarly to the case of the generator utilizing a digital system as shown in FIG. 5. Therefore, the sweep termination accuracy is considerably enhanced and, as a result, both the power consumption and the excess sweeping time loss can be reduced.

As is clear from the embodiments of the present invention shown in FIGS. 5 and 6, since the generation of a sweep termination signal is based on the calculation of addition and comparison of the signal showing the sweep coordinate position, the circuit construction per se can easily be established. Further, the speed in calculation of addition and comparison can sufficiently follow the sweeping speed of a radar, sonar, etc. Therefore, it is possible to generate a sweep termination signal with high accuracy without causing any economical problem.

As described so far, the present invention sets a boundary of a regular octagon circumscribed about a circular CRT screen in an apparatus for sweeping an electron beam on the circular CRT screen by utilization of a polar coordinate deflection system (a PPI system), and allows the sweep to be terminated when mathematic conditions inferring that the sweep position has fallen out of the boundary are satisfied. Accordingly, the present invention makes it possible to generate a sweep termination signal at a position approximating the outer circumferential position of the circular CRT screen at which the sweep is to be terminated. This pronounced enhancement of the sweep termination accuracy results in reduction of the quantity of useless sweep effected outside the outer circumference of the circular CRT screen to thereby lower not only the power consumption but also the sweeping time loss. Further, since the present invention adopts a simple circuit construction which utilizes the treatments merely for addition and comparison and which is suitable for the high sweeping speed of a radar, sonar, etc. to thereby generate a sweep termination signal, it is possible to generate with high accuracy a sweep termination signal without causing any economical problem.

What is claimed is:

1. In a sweep termination signal generating apparatus for a radar system displaying a radar image through sweeping of an electron beam on a circular CRT screen in accordance with a PPI system, the improvement comprising:

a coordinate position calculating means for outputting a deflection position of said electron beam varying with a variation of an antenna rotation angle in the form of a coordinate position (X,Y) in rectangular coordinates having a central point of said circular CRT screen as a coordinate origin; and a sweep termination signal generating means for outputting a sweep termination signal which commands a termination of a sweep signal for deflection of said electron beam when one of the following conditions is satisfied:

(1) an absolute value $|X|$ of X of said coorinate position (X,Y) outputted from said coordinate position calculating means is larger than a display radius R of said circular CRT screen;

(2) an absolute value $|Y|$ of Y of said coordinate position X,Y is larger than said display radius R; and (3) a sum of said absolute values $|X|+|Y|$ is larger than value obtained by multiplying said display radius R by $\sqrt{2}$;

whereby said sweeping is terminated when said electron beam reaches a display boundary of a circumference of said circular CRT screen irrespective of whether a sweep center is said central point of said circular CRT screen or is an off-center point.

2. A sweep termination signal generating apparatus according to claim 1, wherein said sweep termination signal generating means includes:
setting circuits for setting said display radius R of said circular CRT screen and $\sqrt{2}R$, respectively;
arithmetic circuits for calculating said absolute values $|X|$ and $|Y|$ of said coordinate position (X,Y) of said electron beam, respectively;
an addition circuit for adding said absolute values calculated in said arithmetic circuits so as to output said sum of absolute values $|X|+|Y|$;
a first comparator for comparing said absolute value $|X|$ outputted from one of said arithmetic circuits with said display radius R and for outputting a signal when said absolute value $|X|$ is not less than said display radius R;
a second comparator for comparing said absolute value $|Y|$ outputted from the other of said arithmetic circuits with said display radius R and for outputting a signal when said absolute value $|Y|$ is not less than said display radius R;
a third comparator for comparing said sum of absolute values $|X|+|Y|$ outputted from said addition circuit with said value obtained by multiplying said display radius R by $\sqrt{2}$ and for outputting a signal when said sum of absolute values $|X|+|Y|$ is not less than $\sqrt{2}R$; and
an OR circuit for outputting a logical sum of said signal outputs from said first, second and third comparators as said sweep termination signal.

3. A sweep termination signal generating apparatus according to claim 2, wherein said first, second and third comparators and said addition circuit consist of digital comparator circuits and a digital addition circuit, respectively.

4. A sweep termination signal generating apparatus according to claim 2, wherein said first, second and third comparators and said addition circuit consist of analog comparator circuits and an analog addition circuit, respectively.

* * * * *